United States Patent Office 3,538,024
Patented Nov. 3, 1970

3,538,024
ACRYLIC-MODIFIED POLYALKYLENIMINE OR POLYALKYLENEPOLYAMINE
Henry J. Dishburger and William P. Coker, Lake Jackson, Tex., assignors to The Dow Chemical Company, Midland, Mich.
No Drawing. Continuation-in-part of application Ser. No. 564,045, July 11, 1966. This application June 30, 1969, Ser. No. 837,957
Int. Cl. C08g 33/06, 33/08
U.S. Cl. 260—2          11 Claims

ABSTRACT OF THE DISCLOSURE

A polyalkylenimine or polyalkylenepolyamine is modified by an addition reaction with acrylic acids and their alkali metal derivatives at a plurality of the amine hydrogens in the polymers. The new compositions have utility as adhesion promoters.

CROSS-REFERENCE TO RELATED APPLICATION

This application is a continuation-in-part of our copending application Ser. No. 564,045, filed July 11, 1966, now abandoned.

BACKGROUND OF THE INVENTION

The present invention relates to a modified polyalkylenimine or polyalkylenepolyamine product and process. More particularly, it relates to a polyalkylenimine (hereinafter PAI) or a polyalkylenepolyamine (hereinafter PAPA) which has been modified by an addition reaction with acrylic acids and their alkali metal derivatives at a plurality of the amine hydrogens in the polymers. The compositions of the present invention have a demonstrated utility as adhesion promoters.

A wide variety of additions has been made to PAI and PAPA to produce modified polymeric compositions having many different properties. Such modifications of PAI are discussed, for example, in the booklet, "Montrek Polyethylenimine Products," Form No. 125–598–66, The Dow Chemical Company, Midland, Mich. (1966), pages 5–6.

It is known that compounds having an activated double bond may be attached to the polymer chain of PAI through the double bond according to the reaction:

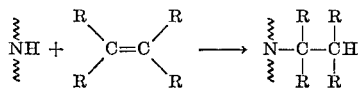

wherein one of the R's is an activating group, e.g. cyano or phenyl.

SUMMARY OF THE INVENTION

It has now been discovered that acrylic acids and their alkali metal salts may be attached to the polymer chain of PAI or PAPA by undergoing an addition reaction, in the manner of compounds having activated double bonds, with a plurality of the amine hydrogens in the polymer, rather than forming a salt or an amide. The novel polymers of the present invention are believed to be formed by the following reaction:

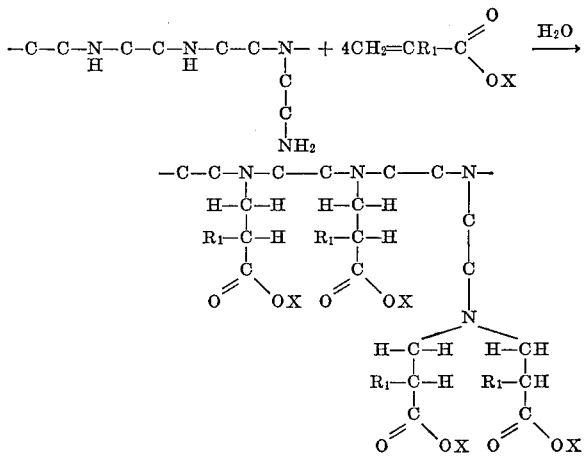

wherein $R_1$ is hydrogen or methyl and X is hydrogen or an alkali metal such as sodium, potassium, or lithium. The groups shown attached to the nitrogen atoms of the polymer chain above shall be referred to hereinafter as substituent acrylic groups. The structure shown for the resulting product is idealized and merely representative of the branching which may occur in the polymer chain. The substituent groups are randomly attached to the PAI or PAPA chain through the nitrogen atoms as indicated.

The polymers of the present invention may be prepared by combining, total reactants basis, from about 10 percent by weight to about 70 percent by weight of one or more acrylic acid or derivative and from about 90 percent by weight to about 30 percent by weight PAI or PAPA.

Preferably, from about 20 percent by weight to about 60 percent by weight of the modifier is combined with from about 80 percent by weight to about 40 percent by weight of the PAI or PAPA. The modifier and PAI or PAPA are allowed to react at a temperature of from about 30° C. to about 100° C. until the reaction is essentially complete.

Suitable PAI's for the practice of this invention are generally highly branched and include the polymers of alkylenimines containing from 2 to about 5 carbon atoms. The polymerization of such alkylenimines has been reviewed in Jones, "The Polymerization of Olefin Amines," in P. H. Plesch, ed., The Chemistry of Cationic Polymerization, New York, MacMillan (1963), pages 521–534. Suitable PAI's disclosed by Jones include the polymers of ethylenimine, 2-methylethylenimine, 2-ethylethylenimine, cis - 2,3-dimethylethylenimine, trans-2,3-dimethylethylenimine, 2,2-dimethylethylenimine, and the like.

In addition, branched polyalkylenepolyamines are operable for the practice of this invention. PAPA's may be prepared, for example, by further polymerizing an alkylenepolyamine, such as ethylenediamine, diethylenetriamine, triethylenetetramine, tetraethylenepentamine, or pentaethylenehexamine, by a condensation reaction with a difunctional organic compound, such as a dihaloalkane (e.g., 1,2-dichloroethane), and the like. Such PAPA's have the same empirical formula as the corresponding PAI's.

For use as adhesion promoters, the polymers of the present invention should be water-soluble. The PAI's or PAPA's from which the polymers are prepared may have a molecular weight between about 300 and about 1,000,000 and higher. Preferably, they should have a molecular weight between about 10,000 and about 300,000.

In addition to acrylic acid and methacrylic acid, suitable derivatives for the practice of this invention include the alkali metal acrylates, such as sodium acrylate, potassium acrylate and lithium acrylate, the analogous methacrylate salts, mixtures thereof, and the like. These acrylic compounds shall be referred to hereinafter as acrylic monomers.

It is necessary that the reaction be conducted in an aqueous solution. In water, the reaction proceeds smoothly and readily to give a water-soluble product in aqueous solution. The aqueous solution of said product can be easily concentrated if desired by heating under reduced pressure and can be easily diluted to any desired lesser concentration by simply adding more water. The ease by which the concentration of the solution can be changed is a valuable advantage since for the convenience and economy we prefer to package and ship the more concentrated solutions, and in the adhesive applictaions we prefer to use a more dilute solution.

Suitably, the concentration of reactants in solution is about 1 to about 80 percent solids, based on total composition weight, and preferably is between about 20 and about 60 percent solids. The reaction occurs in concentrations less than 1% and greater than 80% but because of the bulk of the reaction mixture in the first instance and its very high viscosity in the latter instance, concentrations above and below the stated range are avoided.

In practice, the novel polymers of the present invention are prepared by mixing a PAI or PAPA and one or more acrylic monomers as described above, in an aqueous solution. The mixture is heated within a temperature from about 30° to about 100° C. for a sufficient time to allow the reaction to take place. The preferred temperature range is between about 50° and 80° C. The reaction time depends on the temperature used; reaction times of about one hour are necessary in the case of higher reaction temperatures, and reaction times of up to about 48 hours may be necessary in the case of lower temperatures. With the preferred temperature range, reaction times of about two to about eight hours are necessary.

SPECIFIC EMBODIMENTS

The following specific examples describe completely representative embodiments and the best modes contemplated by the inventors for practicing the claimed invention.

EXAMPLE 1

Acrylic acid (16.7 wt. percent) modified polyethylenimine

Into a two liter reaction flask fitted with a thermometer, stirrer, addition funnel, and reflux condenser is added 500 g. of a 15 percent by weight aqueous solution of polyethylenimine having a molecular weight of 50,000 and 85 g. of water. To this is slowly added with stirring 15 g. of acrylic acid. The resulting mixture is refluxed for two hours at a temperature between 60° and 70° C. and cooled to room temperature. The resulting product is a light yellow, slightly hazy solution which has a 1 percent solution viscosity at 100° F. of 1.86 cs.

EXAMPLE 2

Sodium acrylate (30 wt. percent) modified polyethylenimine

A quantity of 500 g. of a 15 percent by weight aqueous solution of polyethylenimine having a molecular weight of 50,000 and 250 g. of a freshly prepared 15 percent by weight solution of sodium acrylate are combined and allowed to react at 80° C. for 2 hours. The resulting product is a clear yellow solution having a 1 percent solution viscosity, at 100° F. of 1.21 cs.

EXAMPLE 2

Sodium acrylate (52 wt. percent) modified polyethylenimine

A quantity of 500 g. of a 15 percent by weight aqueous solution of polyethylenimine having a molecular weight of 50,000 and 81.4 g. sodium acrylate in 444.2 g. water are combined and allowed to react as in Example 2. The resulting product is a clear yellow solution having a 1 percent solution viscosity of 100° F. of 1.14 cs.

The products from the preceding examples are tested as adhesion promoters by wiping 40-pound kraft paper with a 1.0 percent by weight solution of the polymer, drying, and coating the treated paper with a 0.005 inch film of polyethylene. The coated paper is then tested for adhesion on a Perkins Southwick hand tester. The results obtained are given in the following table.

| Example | Modifier | Wt. percent modifier/wt. percent polyethylenimine | Bond strength of polyethylene burst pressure, p.s.i. |
| --- | --- | --- | --- |
| 1 | Acrylic acid | 16.7/83.3 | 30.6 |
| 2 | Sodium acrylate | 30.0/70.0 | 31.1 |
| 3 | do | 52.0/48.0 | 32.9 |
| Blank [1] | | | 20.9 |

[1] Untreated paper coated with polyethylene.

As shown by the table, the polymers of the present invention give a significant increase in the bond strength of polyethylene to paper when used as adhesion promoters.

In the following examples the polyethylenimine (PEI) was added as an anhydrous powder and the acrylic acid (AA) was added in an amount equal to 30% of the total PEI-AA charge.

EXAMPLE 4

(PEI–AA charge=5% by weight in water)

Into a 3-liter glass, round-bottom reaction flask fitted with a thermometer, stirrer, addition funnel and reflux condenser was placed 70 g. of PEI 12 (anhydrous polyethylenimine having an average molecular weight of 1200). To this was added 1900 g. of water and the mixture was stirred until solution was complete. Thirty grams of acrylic acid was slowly added to the solution in the flask at ambient temperature. The resulting solution was then heated for one hour at about 80° C. The reaction produced a solution having a light yellow color and a 1 percent solution viscosity in water at 100° F. of 0.735 cs. The reaction solution was evaporated to dryness to give a solid product which was readily redissolved in water.

EXAMPLE 5

(PEI–AA charge=75% by weight in water)

In the manner of Example 4, 70 g. PEI 12 was dissolved in 33.3 g. of water in a 500-ml. flask and 30 g. of acrylic acid was slowly added to it. The solution was heated for 1 hour at about 80° C. The resulting solution was orange in color and had a 1 percent solution viscosity in water at 100° F. to 0.737 cs. The product isolated from the reaction solution by evaporating it to dryness was easily redissolved in water.

Substitution of other PAI's and PAPA's as defined above and other derivatives of acrylic acids, either singly or in a mixture of two or more acrylic acid derivatives, as defined above gives similar polymer products.

What is claimed is:
1. A process for preparing a modified polyalkylenimine or polyalkylenepolyamine which comprises heating in aqueous solution, a mixture comprising from about 30 to about 90 percent by weight of a branched polyalkylen- imine or polyalkylenepolyamine and from about 10 to about 70 percent by weight of one or more acrylic monomers selected from the group consisting of acrylic acid, methacrylic acid and the alkali metal acrylates and methacrylates.

2. The process of claim 1 wherein the mixture comprises from about 40 to about 80 weight percent polyalkylenimine and from about 20 to about 60 weight percent of one or more acrylic monomers.

3. The process of claim 1 wherein the polyalkylenimine is polyethylenimine.

4. The process of claim 1 wherein the acrylic monomer is acrylic acid or sodium acrylate.

5. The process of claim 1 wherein the polyalkylenimine is polyethylenimine and the acrylic monomer is acrylic acid or sodium acrylate.

6. The process of claim 1 wherein the concentration of reactants in aqueous solution is between about 1 and about 80 percent solids, based on total composition weight.

7. The process of claim 6 wherein the concentration is between about 20 and about 60 percent solids, based on total composition weight.

8. The product produced by the process of claim 1.
9. The product produced by the process of claim 3.
10. The product produced by the process of claim 4.
11. The product produced by the process of claim 5.

References Cited

UNITED STATES PATENTS

| | | | |
|---|---|---|---|
| 2,626,931 | 1/1953 | Bestian | 260—2 |
| 3,134,740 | 5/1964 | Sheetz | 260—2 |
| 3,251,778 | 5/1966 | Dickson et al. | 260—2 |

SAMUEL H. BLECH, Primary Examiner

U.S. Cl. X.R.

117—72; 156—331; 161—247